United States Patent
Tokimune et al.

(10) Patent No.: US 9,890,269 B2
(45) Date of Patent: *Feb. 13, 2018

(54) TIRE RUBBER COMPOSITION AND PNEUMATIC TIRE

(71) Applicant: SUMITOMO RUBBER INDUSTRIES, LTD., Kobe-shi, Hyogo (JP)

(72) Inventors: Ryuichi Tokimune, Kobe (JP); Tatsuya Miyazaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,873

(22) PCT Filed: Jan. 21, 2015

(86) PCT No.: PCT/JP2015/051457
§ 371 (c)(1),
(2) Date: Dec. 3, 2015

(87) PCT Pub. No.: WO2015/125538
PCT Pub. Date: Aug. 27, 2015

(65) Prior Publication Data
US 2016/0122518 A1    May 5, 2016

(30) Foreign Application Priority Data

Feb. 21, 2014    (JP) ................................ 2014-031968

(51) Int. Cl.
| | | |
|---|---|---|
| C08L 71/02 | (2006.01) | |
| C08L 7/00 | (2006.01) | |
| B60C 1/00 | (2006.01) | |
| C08K 3/06 | (2006.01) | |
| C08K 3/36 | (2006.01) | |
| C08L 9/00 | (2006.01) | |

(52) U.S. Cl.
CPC ................ *C08L 7/00* (2013.01); *B60C 1/00* (2013.01); *B60C 1/0016* (2013.01); *C08K 3/06* (2013.01); *C08K 3/36* (2013.01); *C08L 9/00* (2013.01); *C08L 71/02* (2013.01); *C08G 2650/58* (2013.01); *C08L 2205/02* (2013.01); *C08L 2205/03* (2013.01)

(58) Field of Classification Search
CPC .............. C08L 71/02; C08L 7/00; C08L 9/00
See application file for complete search history.

(56) References Cited

U.S. PATENT DOCUMENTS

| | | | |
|---|---|---|---|
| 5,219,944 A * | 6/1993 | Scriver | C08L 7/00 152/905 |
| 6,598,632 B1 | 7/2003 | Moreland et al. | |
| 2001/0051677 A1 | 12/2001 | Bataille et al. | |
| 2007/0141143 A1* | 6/2007 | Smithey | A61K 9/1635 424/464 |
| 2016/0122517 A1* | 5/2016 | Tokimune | C08L 7/00 524/418 |

FOREIGN PATENT DOCUMENTS

| | | | |
|---|---|---|---|
| CN | 105253500 A | 1/2016 | |
| JP | 5-194790 A | 8/1993 | |
| JP | 9-87427 A | 3/1997 | |
| JP | 2001-200105 A | 7/2001 | |
| JP | 2003-504478 A | 2/2003 | |
| JP | 2005-502753 A | 1/2005 | |
| JP | 2009-51935 A | 3/2009 | |
| JP | 2012-136581 A | 7/2012 | |
| JP | 2015-974 A | 1/2015 | |
| WO | WO 03/022914 A1 | 3/2003 | |
| WO | WO 2012004054 A1 * | 1/2012 | ............... C08K 3/04 |

OTHER PUBLICATIONS

Machine translation of WO 2012/004054 A1, Jan. 2012.*
International Search Report, issued in PCT/JP2015/051457, dated Apr. 28, 2015.
Written Opinion of the International Searching Authority, issued in PCT/JP2015/051457, dated Apr. 28, 2015.
Alexandridis, P. and T. A. Hatton, "Poly(ethylene oxide)-poly(propylene oxide)-poly(ethylene oxide) block copolymer surfactants in aqueous solutions and at interfaces: thermodynamics, structure, dynamics, and modeling," Colloids and Surfaces A: Physiochemical Engineering Aspects (1995), vol. 96, pp. 1-46.

* cited by examiner

*Primary Examiner* — Vickey Nerangis
(74) *Attorney, Agent, or Firm* — Birch, Stewart, Kolasch & Birch, LLP

(57) ABSTRACT

The present invention provides a rubber composition for tires capable of improving discoloration resistance and tire appearance while maintaining or improving good fuel economy, good abrasion resistance, and good performance on ice, and a pneumatic tire formed from the rubber composition. The present invention relates to a rubber composition for tires, containing a Pluronic nonionic surfactant in an amount of 0.1 to 6.0 parts by mass relative to 100 parts by mass of the rubber component, the rubber composition having a combined amount of polybutadiene rubber, natural rubber, and polyisoprene rubber of 70% by mass or more based on 100% by mass of the rubber component, and the rubber composition containing sulfur.

7 Claims, No Drawings

TIRE RUBBER COMPOSITION AND PNEUMATIC TIRE

TECHNICAL FIELD

The present invention relates to a rubber composition for tires, and a pneumatic tire formed from the rubber composition.

BACKGROUND ART

Automobile tires are produced from rubber compositions containing natural rubber and/or synthetic diene rubbers as raw materials. Such tires are degraded in the presence of ozone and may eventually be cracked. In order to suppress crack formation and growth in the presence of ozone, rubber compositions contain, for example, additives, including antioxidants, such as N-(1,3-dimethylbutyl)-N'-phenyl-p-phenylenediamine (6PPD) or poly(2,2,4-trimethyl-1,2-)dihydroquinoline (TMDQ), and petroleum wax.

The antioxidants and petroleum wax in vulcanized rubber migrate (bloom) to the surface of rubber such as tires, thereby protecting the rubber from ozone. Unfortunately, excessive blooming of the antioxidants and petroleum wax in a short period of time causes white discoloration. Also, the antioxidants degraded by ozone cause brown discoloration, and similar excessive blooming of them intensifies brown discoloration. In addition, if wax and the like bloomed on the tire surface form irregularities, diffused reflection of light occurs, making the brown discoloration caused by the degraded antioxidants more noticeable. Thus, the shine of the tires is also lost.

Patent Literature 1 discloses the addition of a polyoxyethylene ether nonionic surfactant for preventing deterioration of tire appearance. Yet, this technique needs improvement in terms of improving discoloration resistance and tire appearance while maintaining or improving good fuel economy, good abrasion resistance, and good performance on ice.

CITATION LIST

Patent Literature

Patent Literature 1: JP H05-194790 A

SUMMARY OF INVENTION

Technical Problem

The present invention aims to solve the above problem and provide a rubber composition for tires capable of improving discoloration resistance and tire appearance while maintaining or improving good fuel economy, good abrasion resistance, and good performance on ice, and a pneumatic tire formed from the rubber composition.

Solution to Problem

The present invention relates to a rubber composition for tires, containing a Pluronic nonionic surfactant in an amount of 0.1 to 6.0 parts by mass relative to 100 parts by mass of a rubber component in the rubber composition, the rubber composition having a combined amount of polybutadiene rubber, natural rubber, and polyisoprene rubber of 70% by mass or more based on 100% by mass of the rubber component, and the rubber composition containing sulfur.

The rubber composition for tires preferably contains silica in an amount of 15 to 150 parts by mass relative to 100 parts by mass of the rubber component.

The rubber composition for tires preferably contains styrene butadiene rubber in an amount of 1 to 30% by mass based on 100% by mass of the rubber component.

The rubber composition for tires preferably contains sulfur in an amount of 0.1 to 6.0 parts by mass relative to 100 parts by mass of the rubber component.

The present invention also relates to a pneumatic tire, including a tire component formed from the rubber composition.

The tire component is preferably a tread.

The pneumatic tire is preferably a winter tire.

Advantages Effects of Invention

The rubber composition for tires of the present invention contains a Pluronic nonionic surfactant in an amount of 0.1 to 6.0 parts by mass relative to 100 parts by mass of the rubber component, the rubber composition having a combined amount of polybutadiene rubber, natural rubber, and polyisoprene rubber of 70% by mass or more based on 100% by mass of the rubber component, and the rubber composition containing sulfur. Such a rubber composition is capable of improving discoloration resistance and tire appearance while maintaining or improving good fuel economy, good abrasion resistance, and good performance on ice. The use of the rubber composition enables production of pneumatic tires which are excellent in fuel economy, abrasion resistance, performance on ice, discoloration resistance, and appearance.

DESCRIPTION OF EMBODIMENTS

The rubber composition for tires of the present invention contains a Pluronic nonionic surfactant in an amount of 0.1 to 6.0 parts by mass relative to 100 parts by mass of a rubber component, the rubber composition having a combined amount of polybutadiene rubber, natural rubber, and polyisoprene rubber of 70% by mass or more based on 100% by mass of the rubber component, and the rubber composition containing sulfur.

The rubber composition of the present invention contains a Pluronic nonionic surfactant in addition to a specific rubber component and sulfur. With the use of such a rubber composition, the irregularities (bloom layer) formed on the tire surface due to blooming of wax and the like are smoothened so that diffused reflection of light can be suppressed. This also reduces, for example, the brown discoloration and the white discoloration described above, thus improving discoloration resistance. Further, this also imparts, for example, adequate black appearance and shine to the tire surface, thus improving tire appearance. At the same time, this makes it possible to maintain or improve good performance on ice, good fuel economy, and good abrasion resistance.

In addition, the rubber composition can improve tire appearance while maintaining or improving performance on ice, fuel economy and abrasion resistance as described above, presumably because the compatibility between the rubber composition and the Pluronic nonionic surfactant is properly controlled.

The Pluronic nonionic surfactant used in the present invention is also called polyoxyethylene polyoxypropylene glycol, polyoxyethylene polyoxypropylene block polymer, or polypropylene glycol ethylene oxide adduct, and is generally a nonionic surfactant represented by Formula (I) below. As shown in Formula (I), the Pluronic nonionic surfactant contains on both sides thereof a hydrophilic group having an ethylene oxide structure, and also contains a hydrophobic group having a propylene oxide structure between the hydrophilic groups.

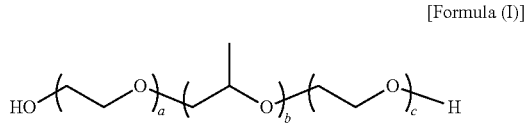

[Formula (I)]

In Formula (I), a, b, and c each represent an integer.

The degree of polymerization of the polypropylene oxide block (b in Formula (I)) and the number of polyethylene oxide units added (a+c in Formula (I)) in the Pluronic nonionic surfactant are not particularly limited and may be appropriately chosen according to the service conditions, purpose, or the like. A surfactant with a higher proportion of the polypropylene oxide block tends to have higher affinity for rubber and thus to migrate to the rubber surface at a slower rate. In particular, the degree of polymerization of the polypropylene oxide block (b in Formula (I)) is preferably 100 or less, more preferably 10 to 70, still more preferably 10 to 60, particularly preferably 20 to 60, most preferably 20 to 45, in order to suitably control blooming of the nonionic surfactant and thereby achieve the effects of the present invention more suitably. For the same reason, the number of polyethylene oxide units added (a+c in Formula (I)) is preferably 100 or less, more preferably 3 to 65, still more preferably 5 to 55, particularly preferably 5 to 40, most preferably 10 to 40. When the degree of polymerization of the polypropylene oxide block and the number of polyethylene oxide units added fall within the respective ranges described above, blooming of the nonionic surfactant can be suitably controlled and the effects of the present invention can be more suitably achieved.

Examples of the Pluronic nonionic surfactant include Pluronic series available from BASF Japan, Ltd., Newpol PE series available from Sanyo Chemical Industries, Ltd., Adeka Pluronic L or F series available from Adeka Corporation industry, Epan series available from Dai-ichi Kogyo Seiyaku Co., Ltd., and Pronon series or UNILUB available from NOF corporation. Each of these may be used alone, or two or more of these may be used in combination.

The amount of the Pluronic nonionic surfactant relative to 100 parts by mass of the rubber component is preferably 0.1 parts by mass or more, more preferably 0.3 parts by mass or more, still more preferably 0.5 parts by mass or more, particularly preferably 1.0 part by mass or more. If the amount is less than 0.1 parts by mass, the effects of the present invention may not be sufficiently obtained. Also, the amount of the Pluronic nonionic surfactant is preferably 6.0 parts by mass or less, more preferably 5.0 parts by mass or less, still more preferably 4.0 parts by mass or less, particularly preferably 3.0 parts by mass or less. If the amount is more than 6.0 parts by mass, handling stability, crack resistance, ozone resistance, discoloration resistance, fuel economy, abrasion resistance, and performance on ice may be deteriorated.

The rubber composition of the present invention contains at least one rubber selected from the group consisting of polybutadiene rubber (BR), natural rubber (NR), and polyisoprene rubber (IR). Each of these may be used alone, or two or more of these may be used in combination. In order to better achieve good fuel economy, good abrasion resistance, and good performance on ice, preferably NR or BR is used, and more preferably NR and BR are used in combination.

In the rubber composition, the combined amount of polybutadiene rubber, natural rubber, and polyisoprene rubber (preferably the combined amount of polybutadiene rubber and natural rubber) is 70% by mass or more, preferably 80% by mass or more, based on 100% by mass of the rubber component. The combined amount may be 100% by mass. If the combined amount is less than 70% by mass, fuel economy, abrasion resistance, and performance on ice are not sufficiently obtained. Moreover, the proportions of the polybutadiene rubber, natural rubber, and polyisoprene rubber may be freely chosen as long as reinforcing properties, abrasion resistance, and performance on ice are not impaired.

NR may be, for example, one commonly used in the tire industry, such as SIR20, RSS3, or TSR20. Each of these may be used alone, or two or more of these may be used in combination.

In the case of the rubber composition containing NR, the amount of NR based on 100% by mass of the rubber component is preferably 20% by mass or more, more preferably 30% by mass or more, still more preferably 40% by mass or more. The amount of NR is preferably 80% by mass or less, more preferably 70% by mass or less. If the amount of NR is within the above range, good fuel economy, good abrasion resistance, and good performance on ice are more favorably obtained.

IR is not particularly limited, and may be IRs commonly used in the tire industry. Each of those IRs may be used alone, or two or more thereof may be used in combination.

BR is not particularly limited, and may be, for example, BR730 or BR51 available from JSR Corporation, BR 1220 available from Zeon Corporation, high-cis BR such as BR130B, BR150B, or BR710 available from Ube Industries, Ltd, or the like. Each of these may be used alone, or two or more of these may be used in combination. In order to better achieve good fuel economy, good abrasion resistance, and good performance on ice, the BR has a cis content of preferably 90% by mass or more, more preferably 95% by mass or more.

In the case of the rubber composition containing BR, the amount of BR based on 100% by mass of the rubber component is preferably 10% by mass or more, more preferably 20% by mass or more. If the amount is less than 10% by mass, the performance on ice and abrasion resistance may be deteriorated. The amount of BR is preferably 70% by mass or less, more preferably 50% by mass or less. If the amount of BR is within the above range, good fuel economy, good abrasion resistance, and good performance on ice can be more favorably obtained.

The rubber composition of the present invention may contain styrene butadiene rubber (SBR). The rubber composition containing SBR can achieve better fuel economy and abrasion resistance.

SBR is not particularly limited, and may be appropriately selected from those commonly used in the tire industry, such as emulsion-polymerized styrene butadiene rubber (E-SBR) or solution-polymerized styrene butadiene rubber (S-SBR), according to the use condition, purposes of use, or the like. Each of these may be used alone, or two or more of these may be used in combination. For example, SL series available from JSR Corporation, Tufdene series available from Asahi Kasei Chemicals Corporation, ASAPRENE E15 available from Asahi Kasei Chemicals Corporation, NIPOL series available from Zeon Corporation, or the like may be used.

The SBR has a styrene content of preferably 5% by mass or more, more preferably 10% by mass or more, still more preferably 15% by mass or more. Also, the SBR has a styrene content of preferably 60% by mass or less, more preferably 50% by mass or less, still more preferably 40% by mass or less, particularly preferably 30% by mass or less. The styrene content of SBR is determined by $^1$H-NMR measurement in the present invention.

In the case of the rubber composition containing SBR, the amount of SBR based on 100% by mass of the rubber component is preferably 1% by mass or more, more preferably 5% by mass or more. Also, the amount of SBR is preferably 30% by mass or less, more preferably 25% by mass or less. If the amount of SBR is more than 30% by mass, performance on ice may not be sufficiently obtained.

In addition to BR, NR, IR, and SBR, the rubber composition may contain any rubber component. Examples of such rubber component include diene rubbers such as styrene-isoprene-butadiene rubber (SIBR), chloroprene rubber (CR), acrylonitrile butadiene rubber (NBR), ethylene-propylene-diene rubber (EPDM), butyl rubber (IIR), or halogenated butyl rubber (X-IIR). Each of these may be used alone, or two or more of these may be used in combination.

Sulfur is added in the present invention to form adequate crosslinks between polymer chains. Examples of sulfur include those commonly used in the rubber industry, such as powdered sulfur, precipitated sulfur, colloidal sulfur, insoluble sulfur, highly dispersible sulfur, or soluble sulfur. Each of these may be used alone, or two or more of these may be used in combination.

The amount of sulfur relative to 100 parts by mass of the rubber component is preferably 0.1 parts by mass or more, more preferably 0.5 parts by mass or more. If the amount of sulfur is less than 0.1 parts by mass, the effects of the present invention may not be sufficiently obtained. The amount of sulfur is preferably 6.0 parts by mass or less, more preferably 5.0 parts by mass or less, still more preferably 4.0 parts by mass or less, particularly preferably 3.0 parts by mass or less, most preferably 1.5 parts by mass or less. If the amount of sulfur is more than 6.0 parts by mass, fuel economy, abrasion resistance, or performance on ice may be deteriorated. When the amount of sulfur is adjusted to the above range, blooming of the nonionic surfactant can be suitably controlled and the effects of the present invention can be well achieved.

An alkylphenol-sulfur chloride condensate (for example, Tackirol V200 available from Taoka Chemical Co., Ltd.), in addition to sulfur, may be used as a vulcanizing agent in the present invention.

The rubber composition of the present invention may contain silica. The rubber composition containing silica can achieve better fuel economy, abrasion resistance, and performance on ice. Non-limiting examples of silica include dry silica (anhydrous silicic acid) and wet silica (hydrous silicic acid). Each of these may be used alone, or two or more of these may be used in combination. Wet silica is preferred because it has many silanol groups.

The silica preferably has a nitrogen adsorption specific surface area ($N_2SA$) of 50 $m^2/g$ or more, more preferably 100 $m^2/g$ or more, still more preferably 150 $m^2/g$ or more. The use of silica having a $N_2SA$ of less than 50 $m^2/g$ tends to result in reduced fuel economy, abrasion resistance, or performance on ice. The silica has a $N_2SA$ of preferably 250 $m^2/g$ or less, more preferably 210 $m^2/g$ or less. Silica having a $N_2SA$ of more than 250 $m^2/g$ tends to be poorly dispersed so that fuel economy, abrasion resistance, or performance on ice tends to be deteriorated.

The $N_2SA$ of silica is a value determined by the BET method in conformity with ASTM D3037-93.

In the case of the rubber composition containing silica, the amount of silica relative to 100 parts by mass of the rubber component is preferably 15 parts by mass or more, more preferably 20 parts by mass or more, still more preferably 25 parts by mass or more, particularly preferably 40 parts by mass or more. Also, the amount of silica is preferably 150 parts by mass or less, more preferably 130 parts by mass or less, still more preferably 120 parts by mass or less, particularly preferably 100 parts by mass or less. If the amount of silica is more than 150 parts by mass, abrasion resistance, discoloration resistance, or tire appearance tends to deteriorate. If the amount of silica is adjusted to the above range, good performance on ice and a good reinforcing effect can be obtained.

The rubber composition of the present invention preferably contains a silane coupling agent together with silica.

Any silane coupling agent conventionally used in combination with silica in the rubber industry may be used. Examples of such silane coupling agents include sulfide silane coupling agents such as bis(3-triethoxysilylpropyl) disulfide; mercapto silane coupling agents such as 3-mercaptopropyltrimethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Each of these may be used alone, or two or more of these may be used in combination. Sulfide silane coupling agents are preferred, and bis(3-triethoxysilylpropyl)disulfide is more preferred.

In the case of the rubber composition containing a silane coupling agent, the amount of silane coupling agent relative to 100 parts by mass of silica is preferably 2 parts by mass or more, more preferably 5 parts by mass or more. If the amount of silane coupling agent is less than 2 parts by mass, fuel economy, abrasion resistance, or performance on ice tends to be decreased. Also, the amount of silane coupling agent is preferably 20 parts by mass or less, more preferably 15 parts by mass or less. If the amount of silane coupling agent is more than 20 parts by mass, an effect commensurate with the increase in the cost tends not to be obtained.

The rubber composition of the present invention may contain carbon black. The rubber composition containing carbon black provides good reinforcing properties and good abrasion resistance as well as higher discoloration resistance and better tire appearance.

Non-limiting examples of the carbon black include GPF, FEF, HAF, ISAF, and SAF. Each of these may be used alone, or two or more of these may be used in combination.

The carbon black has a nitrogen adsorption specific surface area ($N_2SA$) of preferably 20 $m^2/g$ or more, more preferably 50 $m^2/g$ or more. If the carbon black has a $N_2SA$ of less than 20 $m^2/g$, sufficient reinforcing properties may not be obtained. The carbon black has a $N_2SA$ of preferably 180 $m^2/g$ or less, more preferably 120 $m^2/g$ or less, still more preferably 90 $m^2/g$ or less, particularly preferably 80 $m^2/g$ or less. Carbon black having a $N_2SA$ of more than 180 $m^2/g$ tends to be poorly dispersed so that reinforcing properties or abrasion resistance tends to be deteriorated.

The $N_2SA$ of carbon black is determined in conformity with JIS K 6217-2:2001.

The carbon black has a dibutyl phthalate (DBP) oil absorption of preferably 50 mL/100 g or more, more preferably 80 mL/100 g or more. If the carbon black has a DBP oil absorption of less than 50 mL/100 g, sufficient reinforcing properties may not be obtained. The carbon black has a DBP oil absorption of preferably 200 mL/100 g or less, more preferably 135 mL/100 g or less, still more preferably 115 mL/100 g or less. The carbon black having a DBP oil absorption of more than 200 mL/100 g tends to be poorly dispersed so that reinforcing properties or abrasion resistance tends to be deteriorated.

The DBP oil absorption of carbon black is determined in conformity with JIS K 6217-4:2001.

In the case of the rubber composition containing carbon black, the amount of carbon black relative to 100 parts by mass of the rubber component is preferably 2 parts by mass or more, more preferably 3 parts by mass or more. If the amount of carbon black is less than 2 parts by mass, sufficient reinforcing properties may not be obtained. The amount of carbon black is preferably 50 parts by mass or less, more preferably 30 parts by mass or less, still more preferably 20 parts by mass or less, particularly preferably 15 parts by mass or less. If the amount of carbon black is more than 50 parts by mass, fuel economy, abrasion resistance, or performance on ice tends to deteriorate.

In the present invention, wax is preferably added in order to suppress crack formation and growth due to ozone. In the present invention, even when wax is added, the irregularities (bloom layer) formed on the tire surface due to blooming of wax and the like are smoothened so that diffused reflection of light can be suppressed, as described above. Therefore, the brown discoloration and white discoloration described above can be reduced. The wax also imparts, for example, adequate black appearance and shine to the tire surface, thus improving tire appearance. Additionally, the specific rubber composition of the present invention makes it possible to maintain or improve good fuel economy, good abrasion resistance, and good performance on ice.

Non-limiting examples of the wax include petroleum wax, natural wax, and synthetic wax. Those obtained by purifying or chemically treating plural kinds of waxes may also be used. Each of these waxes may be used alone, or two or more of these may be used in combination.

Examples of petroleum wax include paraffin wax and microcrystalline wax. Natural wax may be any wax other than those derived from petroleum resources. Examples of natural wax include vegetable wax such as candelilla wax, carnauba wax, Japan wax, rice wax, or jojoba wax; animal wax such as beeswax, lanolin, or spermaceti; mineral wax such as ozokerite, ceresin, or petrolatum; and purified products thereof. Examples of synthetic wax include polymers of ethylene, propylene or the like.

In the case of the rubber composition containing wax, the amount of wax relative to 100 parts by mass of the rubber component is preferably 0.5 parts by mass or more, more preferably 1.0 part by mass or more. If the amount of wax is less than 0.5 parts by mass, sufficient ozone resistance may not be obtained. The amount of wax is preferably 12 parts by mass or less, more preferably 10 parts by mass or less, still more preferably 5.0 parts by mass or less. An amount of wax exceeding 12 parts by mass is not expected to further enhance ozone resistance, which may result in increased cost.

The rubber composition of the present invention may contain oil. The addition of oil improves processability, allows tires to have flexibility, and contributes to better achieving the effects of the present invention. Examples of oil include process oil, vegetable fats and oils, and mixtures thereof. Examples of process oil include paraffinic process oil, aromatic process oil, and naphthenic process oil. Specific examples of paraffinic process oil include PW-32, PW-90, PW-150, and PS-32 available from Idemitsu Kosan Co., Ltd. Specific examples of aromatic process oil include AC-12, AC-460, AH-16, AH-24, and AH-58 available from Idemitsu Kosan Co., Ltd. Examples of vegetable fats and oils include castor oil, cotton seed oil, linseed oil, rapeseed oil, soybean oil, palm oil, coconut oil, peanuts oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. Each of these may be used alone, or two or more of these may be used in combination. In order to suitably achieve the effects of the present invention, preferred among these are paraffinic process oil and aromatic process oil, and more preferred is a combination of paraffinic process oil and aromatic process oil.

In the case of the rubber composition containing oil, the amount of oil relative to 100 parts by mass of the rubber component is preferably 1.0 part by mass or more, more preferably 5.0 parts by mass or more, still more preferably 10 parts by mass or more, particularly preferably 15 parts by mass or more. Also, the amount of oil is preferably 60 parts by mass or less, more preferably 40 parts by mass or less, still more preferably 30 parts by mass or less. When the amount of oil, which itself blooms to the tire surface, is adjusted to the above range, blooming of the nonionic surfactant can be suitably controlled and the effects of the present invention can be more suitably achieved. If the amount of oil is more than 60 parts by mass, fuel economy tends to deteriorate.

The rubber composition of the present invention preferably contains an antioxidant in order to suppress crack formation and growth due to ozone. Even when the rubber composition of the present invention contains an antioxidant, brown discoloration and white discoloration can be decreased and discoloration resistance and tire appearance can be improved while maintaining or improving good fuel economy, good abrasion resistance, and, good performance on ice.

Non-limiting examples of the antioxidant include naphthylamine antioxidants, quinoline antioxidants, diphenylamine antioxidants, p-phenylenediamine antioxidants, hydroquinone derivatives, phenol (monophenol, bisphenol, trisphenol, polyphenol) antioxidants, thiobisphenol antioxidants, benzoimidazole antioxidants, thiourea antioxidants, phosphite antioxidants, and organic thio acid antioxidants. Each of these may be used alone, or two or more of these may be used in combination. In particular, p-phenylenediamine antioxidants are preferred because they provide good ozone resistance and contribute to more suitably achieving the effects of the present invention.

Examples of p-phenylenediamine antioxidants include N-(1,3-dimethylbutyl)-N'-phenyl-p-phenylenediamine, N-isopropyl-N'-phenyl-p-phenylenediamine, N-1,4-dimethylpentyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine. Each of these may be used alone, or two or more of these may be used in combination. In particular, N-(1,3-dimethylbutyl)-N'-phenyl-p-phenylenediamine is preferred because it provides good ozone resistance, contributes to more suitably achieving the effects of the present invention, and is excellent in cost effectiveness.

In the case of the rubber composition containing an antioxidant, the amount of antioxidant relative to 100 parts by mass of the rubber component is preferably 0.3 parts by mass or more, more preferably 0.5 parts by mass or more, still more preferably 1.0 part by mass or more. If the amount of antioxidant is less than 0.3 parts by mass, sufficient ozone resistance may not be obtained. The amount of antioxidant is preferably 10 parts by mass or less, more preferably 6.0 parts by mass or less. If the amount of antioxidant is more than 10 parts by mass, the amount of blooms of the antioxidant increases, which may deteriorate tire appearance.

The rubber composition of the present invention preferably contains a vulcanization accelerator. Examples of the vulcanization accelerator include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Each of these vulcanization accelerators may be used alone, or two or more of these may be used in combination. In order to more suitably achieve the effects of the present invention, sulfenamide vulcanization accelerators are preferred, and combinations of sulfenamide vulcanization accelerators and guanidine vulcanization accelerators are more preferred.

Examples of sulfenamide vulcanization accelerators include N-tert-butyl-2-benzothiazolylsulfenamide (TBBS), N-cyclohexyl-2-benzothiazolylsulfenamide (CBS), and N,N-dicyclohexyl-2-benzothiazolylsulfenamide (DCBS). Each of these may be used alone, or two or more of these may be used in combination. In order to more suitably achieve the effects of the present invention, CBS is preferred, and a combination of CBS and 1,3-diphenylguanidine is more preferred.

The rubber composition of the present invention preferably contains resin. Examples of the resin include terpene-based resin, rosin, rosin derivatives, coumarone resin, coumarone-indene resin, styrene resin, DCPD resin, C5 petroleum resin, and C9 petroleum resin. Each of these may be used alone, or two or more of these may be used in combination. Terpene-based resin is preferred as it contributes to achieving good fuel economy, good abrasion resistance, and good performance on ice.

Examples of terpene-based resin include terpene resin, modified terpene resin, and terpene phenolic resin. The terpene-based resin has a softening point of preferably 50° C. to 140° C., more preferably 90° C. to 130° C. The softening point of the resin refers to a temperature at which a ball drops in measurement of the softening point that is specified in JIS K 6220-1:2001 measured with a ring and ball softening point measuring apparatus.

In the case of the rubber composition containing resin, the amount of resin relative to 100 parts by mass of the rubber component is preferably 0.5 to 50 parts by mass, more preferably 5 to 20 parts by mass. If the amount of resin is within the above range, good fuel economy, good abrasion resistance, and good performance on ice can be obtained.

The rubber composition of the present invention may appropriately contain compounding agents commonly used in the preparation of rubber compositions, such as zinc oxide, stearic acid, or a tackifier, in addition to the above-mentioned components.

The rubber composition of the present invention may be prepared by known methods, for example, by mixing the components using a rubber kneader such as an open roll mill or a Banbury mixer, and vulcanizing the mixture.

The rubber composition of the present invention can be suitably used in tire components and especially in treads which form a surface (outer surface) of tires and thus need to have good discoloration resistance and tire appearance.

The pneumatic tire of the present invention can be produced from the rubber composition by usual methods. Specifically, the rubber composition containing the components mentioned above, before vulcanization, may be extruded and processed into the shape of a tire component such as a tread, and then formed together with other tire components in a conventional manner on a tire building machine to build an unvulcanized tire, which is then be heated and pressurized in a vulcanizer to form a tire.

The pneumatic tire of the present invention can be used, for example, for passenger vehicles, trucks or buses, or two-wheeled vehicles or as a high performance tire, a winter tire or the like. In particular, the pneumatic tire can be suitably used as a winter tire.

EXAMPLES

The present invention is specifically described with reference to, but not limited to, examples below.

The chemicals used in the examples and comparative examples are collectively listed below.

SBR: ASAPRENE E15 (styrene content: 23% by mass) available from Asahi Kasei Chemicals Corporation

NR: RSS#3

BR: BR730 (cis content: 95% by mass) available from JSR Corporation

Carbon black: ShoblackN330 ($N_2SA$: 75 $m^2/g$, DBP: 102 mL/100 g) available from Cabot Japan K. K.

Silica: Ultrasil VN3 ($N_2SA$: 175 $m^2/g$) available from Evonik Degussa

Silane coupling agent: Si266 (bis(3-triethoxysilylpropyl) disulfide) available from Evonik Degussa Wax: Ozoace wax available from Nippon Seiro Co., Ltd.

Oil 1: process oil PW-32 (paraffinic process oil) available from Idemitsu Kosan Co., Ltd.

Oil 2: Process X-140 (aromatic process oil) available from JX Nippon Oil & Energy Corporation Resin: PX1150N (terpene resin (pinene polymer), softening point: 115° C.) available from Yasuhara Chemical Co., Ltd.

Surfactant 1: NEWPOL PE-64, Pluronic nonionic surfactant (copolymer of PEG/PPG (25/30), a+c: 25 and b: 30 in Formula (I)), available from Sanyo Chemical Industries, Ltd.

Surfactant 2: NEWPOL PE-74, Pluronic nonionic surfactant (copolymer of PEG/PPG (30/35), a+c: 30 and b: 35 in Formula (I)), available from Sanyo Chemical Industries, Ltd.

Surfactant 3: ethylene glycol dibutyl ether available from Tokyo Chemical Industry Co., Ltd.

Antioxidant 1: Nocrac 6C (N-(1,3-dimethylbutyl)-N'-phenyl-p-phenylenediamine) available from Ouchi Shinko Chemical Industrial Co., Ltd.

Antioxidant 2: Nocrac 224 (2,2,4-trimethyl-1,2-dihydroquinoline polymer) available from Ouchi Shinko Chemical Industrial Co., Ltd.

Stearic acid: stearic acid available from NOF Corporation

Sulfur: powdered sulfur available from Tsurumi Chemical Industry Co., Ltd.

Zinc oxide: Zinc oxide #1 available from Mitsui Mining and Smelting Co., Ltd.

Vulcanization accelerator 1: Nocceler CZ (N-cyclohexyl-2-benzothiazolylsulfenamide) available from Ouchi Shinko Chemical Industrial Co., Ltd.

Vulcanization accelerator 2: Nocceler D (1,3-diphenylguanidine) available from Ouchi Shinko Chemical Industrial Co., Ltd.

According to the respective formulations shown in Tables 1 to 4, the chemicals other than the sulfur and the vulcanization accelerators were mixed using a 1.7-L Banbury mixer until the temperature of the mixture reached 160° C. Next, the kneaded mixture was mixed with the sulfur and the vulcanization accelerators using an open roll mill until the temperature of the kneaded mixture reached 105° C. to prepare an unvulcanized rubber composition. The unvulcanized rubber composition was press-vulcanized at 160° C. for 15 minutes to provide a vulcanized rubber composition.

The vulcanized rubber composition was evaluated as described below. Tables 1 to 4 show the result. Comparative Example 1 is taken as the reference comparative example in Table 1. Comparative Examples 4, 6, and 8 are taken as the reference comparative examples in Tables 2, 3, and 4, respectively.

<Fuel Economy>

The tan δ of each vulcanized rubber composition was measured with a spectrometer available from Ueshima Seisakusho Co., Ltd. at a dynamic strain amplitude of 1%, a frequency of 10 Hz, and a temperature of 50° C. The reciprocal of the tan δ is expressed as an index, with the value of the reference comparative example set equal to 100. A higher index indicates a smaller rolling resistance, which in turn indicates better fuel economy. The target index is 98 or higher.

<Abrasion Resistance>

The volume loss of each vulcanized rubber composition was measured with a laboratory abrasion and skid tester (LAT) under a load of 50 N at a rate of 20 km/h and a slip angle of 5°. The results are expressed as an index, with the value of the reference comparative example set equal to 100. A higher index indicates better abrasion resistance.

<Preparation of Ozone-Degraded Sample>

In conformity with JIS K 6259 "Rubber, vulcanized or thermoplastic—Determination of ozone resistance", a specimen of a predetermined size was prepared from each vulcanized rubber composition, and then subjected to a dynamic ozone degradation test to give an ozone-degraded sample. The test was carried out for 48 hours at a frequency of reciprocating motion of 0.5±0.025 Hz, an ozone concentration of 50±5 pphm, a test temperature of 40° C., and a tensile strain of 20±2%.

<Discoloration Resistance Evaluation>

The ozone-degraded sample was analyzed with a chroma meter (CR-310) available from Konica Minolta, Inc. to determine "a" and "b" values (L*a*b* color system). The value of $(a^2+b^2)^{-0.5}$ was used as a parameter and the results were expressed as an index calculated from the equation: (parameter of each formulation)/(parameter of reference comparative example)×100, wherein the value of the reference comparative example was set equal to 100. A higher index indicates less discoloration, which in turn indicates better discoloration resistance.

<Evaluation of Appearance>

The appearance of the ozone-degraded sample was evaluated in an open air based on the following criteria.

AA: Darker black compared to reference comparative example and shiny

A: Darker black compared to reference comparative example and slightly shiny

B: Similar shade of brown as in reference comparative example

C: Darker brown compared to reference comparative example (Dynamic Viscoelasticity Test)

For the vulcanized rubber compositions, the elastic modulus (0.1% G*) at a temperature of 0° C., a frequency of 5 Hz, and an amplitude of 0.1%, and the value (ΔG*) obtained by subtracting the value of 0.1% G* from the value of elastic modulus (40% G*) at an amplitude of 40% were determined using a viscoelasticity measurement tester available from TA Instruments. A value "s" (s satisfies 0<s<1) represented by the equation: s=(ΔG*)/(0.1% G*) was used as an indicator of the balance between performance on ice and handling stability, and the results were expressed as an index relative to the value of Comparative Example 1, 4, 6, or 8 (=100). A higher index indicates a better balance between performance on ice and handling stability, and better performance on ice.

TABLE 1

|  |  | Example | | | | | Comparative Example | | |
|---|---|---|---|---|---|---|---|---|---|
|  |  | 1 | 2 | 3 | 4 | 5 | 1 | 2 | 3 |
| Formulation (parts by mass) | NR | 60 | 60 | 60 | 60 | 60 | 60 | 60 | 60 |
|  | BR | 40 | 40 | 40 | 40 | 40 | 40 | 40 | 40 |
|  | Carbon black | 5 | 5 | 5 | 5 | 5 | 5 | 5 | 5 |
|  | Silica | 60 | 60 | 60 | 60 | 60 | 60 | 60 | 60 |
|  | Silane coupling agent | 5 | 5 | 5 | 5 | 5 | 5 | 5 | 5 |
|  | Wax | 1.5 | 1.5 | 1.5 | 1.5 | 1.5 | 1.5 | 1.5 | 1.5 |
|  | Oil 1 | 15 | 15 | 15 | 15 | 15 | 15 | 15 | 15 |
|  | Oil 2 | 18 | 17 | 15 | 12 | 15 | 18 | 8 | 15 |
|  | Resin | 10 | 10 | 10 | 10 | 10 | 10 | 10 | 10 |
|  | Surfactant 1 | 0.5 | 1.5 | 3 | 6 |  |  |  |  |
|  | Surfactant 2 |  |  |  |  | 3 |  | 10 |  |
|  | Surfactant 3 |  |  |  |  |  |  |  | 3 |
|  | Antioxidant 1 | 2 | 2 | 2 | 2 | 2 | 2 | 2 | 2 |
|  | Antioxidant 2 | 1 | 1 | 1 | 1 | 1 | 1 | 1 | 1 |
|  | Stearic acid | 1.5 | 1.5 | 1.5 | 1.5 | 1.5 | 1.5 | 1.5 | 1.5 |

TABLE 1-continued

|  |  | Example | | | | | Comparative Example | | |
|---|---|---|---|---|---|---|---|---|---|
|  |  | 1 | 2 | 3 | 4 | 5 | 1 | 2 | 3 |
|  | Sulfur | 0.8 | 0.8 | 0.8 | 0.8 | 0.8 | 0.8 | 0.8 | 0.8 |
|  | Zinc oxide | 1.6 | 1.6 | 1.6 | 1.6 | 1.6 | 1.6 | 1.6 | 1.6 |
|  | Vulcanization accelerator 1 | 2 | 2 | 2 | 2 | 2 | 2 | 2 | 2 |
|  | Vulcanization accelerator 2 | 3 | 3 | 3 | 3 | 3 | 3 | 3 | 3 |
| Evaluation result | Fuel economy | 100 | 102 | 103 | 101 | 103 | 100 | 95 | 101 |
|  | Abrasion resistance | 100 | 101 | 102 | 100 | 102 | 100 | 92 | 97 |
|  | Performance on ice | 100 | 101 | 102 | 103 | 101 | 100 | 105 | 101 |
|  | Discoloration resistance | 105 | 109 | 115 | 122 | 116 | 100 | 113 | 106 |
|  | Appearance | A | A | A | AA | A | — | AA | B |

TABLE 2

|  |  | Example | | Comparative Example | |
|---|---|---|---|---|---|
|  |  | 6 | 7 | 4 | 5 |
| Formulation (parts by mass) | SBR | 20 | 20 | 20 | 20 |
|  | NR | 50 | 50 | 50 | 50 |
|  | BR | 30 | 30 | 30 | 30 |
|  | Carbon black | 5 | 5 | 5 | 5 |
|  | Silica | 60 | 60 | 60 | 60 |
|  | Silane coupling agent | 5 | 5 | 5 | 5 |
|  | Wax | 1.5 | 1.5 | 1.5 | 1.5 |
|  | Oil 1 | 15 | 15 | 15 | 15 |
|  | Oil 2 | 15 | 15 | 18 | 15 |
|  | Resin | 10 | 10 | 10 | 10 |
|  | Surfactant 1 | 3 |  |  |  |
|  | Surfactant 2 |  | 3 |  |  |
|  | Surfactant |  |  |  | 3 |
|  | Antioxidant 1 | 2 | 2 | 2 | 2 |
|  | Antioxidant 2 | 1 | 1 | 1 | 1 |
|  | Stearic acid | 1.5 | 1.5 | 1.5 | 1.5 |
|  | Sulfur | 0.8 | 0.8 | 0.8 | 0.8 |
|  | Zinc oxide | 1.6 | 1.6 | 1.6 | 1.6 |
|  | Vulcanization accelerator 1 | 2 | 2 | 2 | 2 |
|  | Vulcanization accelerator 2 | 3 | 3 | 3 | 3 |
| Evaluation result | Fuel economy | 101 | 102 | 100 | 101 |
|  | Abrasion resistance | 101 | 100 | 100 | 97 |
|  | Performance on ice | 102 | 101 | 100 | 100 |
|  | Discoloration resistance | 109 | 110 | 100 | 106 |
|  | Appearance | AA | A | — | A |

TABLE 3

|  |  | Example | | Comparative Example | |
|---|---|---|---|---|---|
|  |  | 8 | 9 | 6 | 7 |
| Formulation (parts by mass) | SBR | 20 | 20 | 20 | 20 |
|  | NR | 50 | 50 | 50 | 50 |
|  | BR | 30 | 30 | 30 | 30 |
|  | Carbon black | 50 | 50 | 50 | 50 |
|  | Silica | 15 | 15 | 15 | 15 |
|  | Silane coupling agent | 1 | 1 | 1 | 1 |
|  | Wax | 1.5 | 1.5 | 1.5 | 1.5 |
|  | Oil 1 | 15 | 15 | 15 | 15 |
|  | Oil 2 | 16 | 16 | 18 | 16 |
|  | Resin | 10 | 10 | 10 | 10 |
|  | Surfactant 1 | 2 |  |  |  |
|  | Surfactant 2 |  | 2 |  |  |
|  | Surfactant 3 |  |  |  | 2 |
|  | Antioxidant 1 | 2 | 2 | 2 | 2 |
|  | Antioxidant 2 | 1 | 1 | 1 | 1 |
|  | Stearic acid | 1.5 | 1.5 | 1.5 | 1.5 |
|  | Sulfur | 0.8 | 0.8 | 0.8 | 0.8 |
|  | Zinc oxide | 1.6 | 1.6 | 1.6 | 1.6 |
|  | Vulcanization accelerator 1 | 2 | 2 | 2 | 2 |
|  | Vulcanization accelerator 2 | 3 | 3 | 3 | 3 |

TABLE 3-continued

|  |  | Example | | Comparative Example | |
|---|---|---|---|---|---|
|  |  | 8 | 9 | 6 | 7 |
| Evaluation result | Fuel economy | 102 | 102 | 100 | 100 |
|  | Abrasion resistance | 102 | 101 | 100 | 96 |
|  | Performance on ice | 101 | 103 | 100 | 102 |
|  | Discoloration resistance | 108 | 109 | 100 | 105 |
|  | Appearance | A | A | — | A |

TABLE 4

|  |  | Example | | Comparative Example | |
|---|---|---|---|---|---|
|  |  | 10 | 11 | 8 | 9 |
| Formulation (parts by mass) | NR | 60 | 60 | 60 | 60 |
|  | BR | 40 | 40 | 40 | 40 |
|  | Carbon black | 5 | 5 | 5 | 5 |
|  | Silica | 150 | 150 | 150 | 150 |
|  | Silane coupling agent | 13 | 13 | 13 | 13 |
|  | Wax | 1.5 | 1.5 | 1.5 | 1.5 |
|  | Oil 1 | 15 | 15 | 15 | 15 |
|  | Oil 2 | 15 | 15 | 18 | 15 |
|  | Resin | 10 | 10 | 10 | 10 |
|  | Surfactant 1 | 3 |  |  |  |
|  | Surfactant 2 |  | 3 |  |  |
|  | Surfactant 3 |  |  |  | 3 |
|  | Antioxidant 1 | 2 | 2 | 2 | 2 |
|  | Antioxidant 2 | 1 | 1 | 1 | 1 |
|  | Stearic acid | 1.5 | 1.5 | 1.5 | 1.5 |
|  | Sulfur | 0.8 | 0.8 | 0.8 | 0.8 |
|  | Zinc oxide | 1.6 | 1.6 | 1.6 | 1.6 |
|  | Vulcanization accelerator 1 | 2 | 2 | 2 | 2 |
|  | Vulcanization accelerator 2 | 3 | 3 | 3 | 3 |
| Evaluation result | Fuel economy | 103 | 104 | 100 | 99 |
|  | Abrasion resistance | 102 | 102 | 100 | 96 |
|  | Discoloration resistance | 113 | 110 | 100 | 104 |
|  | Performance on ice | 102 | 103 | 100 | 101 |
|  | Appearance | A | A | — | A |

In the examples in which the rubber composition contained a Pluronic nonionic surfactant in an amount of 0.1 to 6.0 parts by mass relative to 100 parts by mass of the rubber component, had a combined amount of polybutadiene rubber, natural rubber, and polyisoprene rubber of 70% by mass or more based on 100% by mass of the rubber component, and contained sulfur, discoloration resistance and rubber (tire) appearance were improved while maintaining or improving good fuel economy, good abrasion resistance, and good performance on ice.

The invention claimed is:

1. A rubber composition for tires, comprising a nonionic surfactant represented by Formula (I) below in an amount of 0.1 to 6.0 parts by mass relative to 100 parts by mass of a rubber component in the rubber composition,

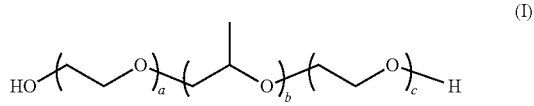

(I)

wherein each of a, b, and c represents an integer, b is 20 to 40, and a+c is 10 to 48, wherein the rubber composition has a combined amount of polybutadiene rubber, natural rubber, and polyisoprene rubber of 70% by mass or more based on 100% by mass of the rubber component, and wherein the rubber composition comprises sulfur.

2. The rubber composition for tires according to claim 1, wherein the rubber composition comprises silica in an amount of 15 to 150 parts by mass relative to 100 parts by mass of the rubber component.

3. The rubber composition for tires according to claim 1, wherein the rubber composition comprises styrene butadiene rubber in an amount of 1 to 30% by mass based on 100% by mass of the rubber component.

4. The rubber composition for tires according to claim 1, wherein the rubber composition comprises the sulfur in an amount of 0.1 to 6.0 parts by mass relative to 100 parts by mass of the rubber component.

5. A pneumatic tire, comprising a tire component formed from the rubber composition according to claim 1.

6. The pneumatic tire according to claim 5, wherein the tire component is a tread.

7. The pneumatic tire according to claim 5, which is a winter tire.

* * * * *